(No Model.) 4 Sheets—Sheet 1.

G. B. BOOMER.
PRESS.

No. 294,571. Patented Mar. 4, 1884.

WITNESSES:
Chas. Wahlers
William Miller

INVENTOR
George B. Boomer
BY Van Santvoord & Stauff
ATTORNEYS (No Model.)

G. B. BOOMER.
PRESS.

No. 294,571.

4 Sheets—Sheet 3.

Patented Mar. 4, 1884.

WITNESSES:
Chas. Wahlers.
William Miller

INVENTOR
George B. Boomer
BY Van Santvoord & Hauff,
ATTORNEYS

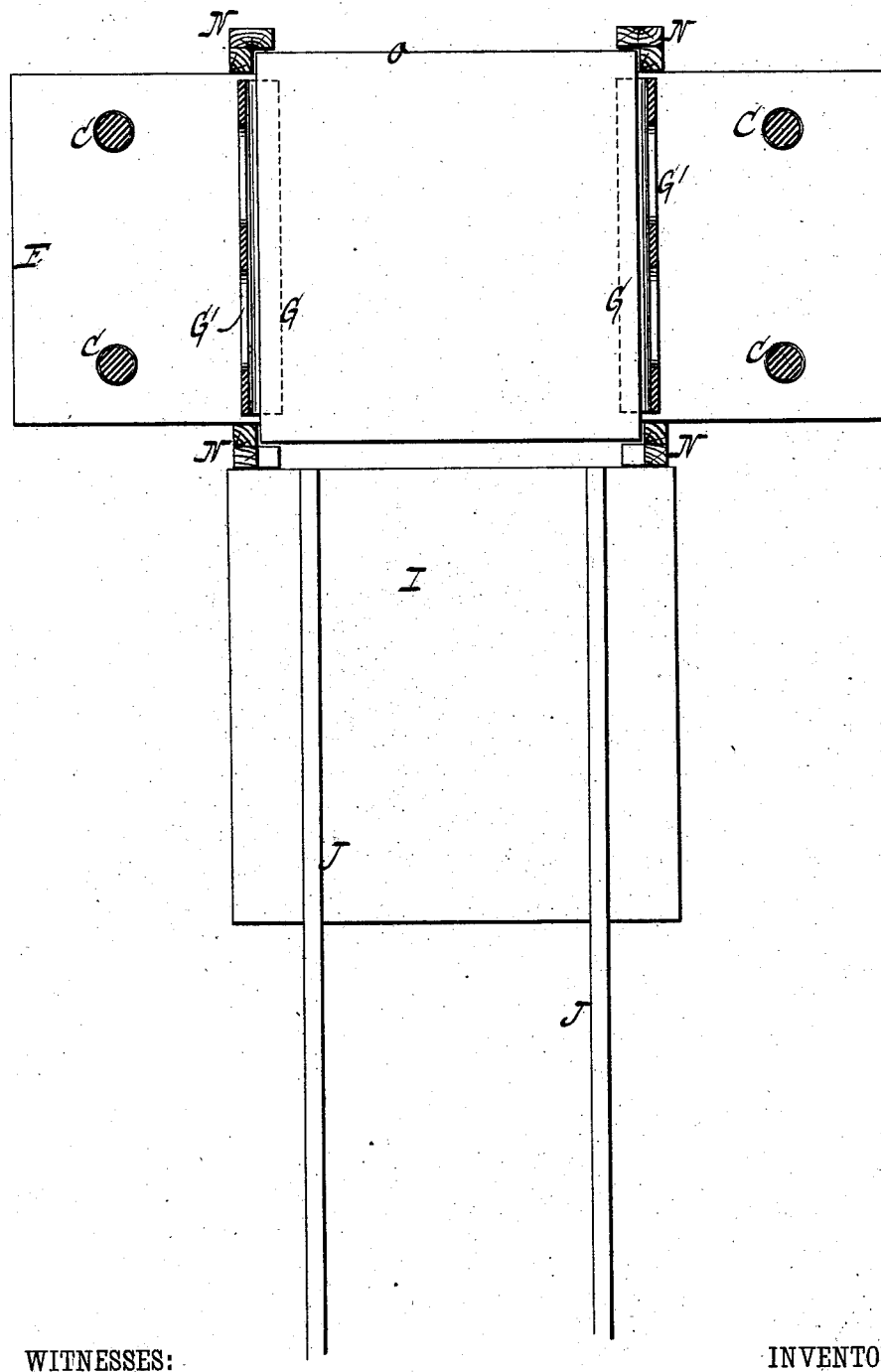

UNITED STATES PATENT OFFICE.

GEORGE B. BOOMER, OF TARRYTOWN, NEW YORK.

PRESS.

SPECIFICATION forming part of Letters Patent No. 294,571, dated March 4, 1884.

Application filed December 12, 1883. (No model.)

*To all whom it may concern:*

Be it known that I, GEORGE B. BOOMER, a citizen of the United States, residing at Tarrytown, in the county of Westchester and State of New York, have invented new and useful Improvements in Presses, of which the following is a specification.

The object of my invention is to furnish a press in which a series of plates, each filled with the proper material, may be laid one upon the other, to be compressed in an upward direction; and it consists in the means hereinafter described, for loading and unloading the press and for keeping the press-plates in a true vertical plane.

Figure 1:
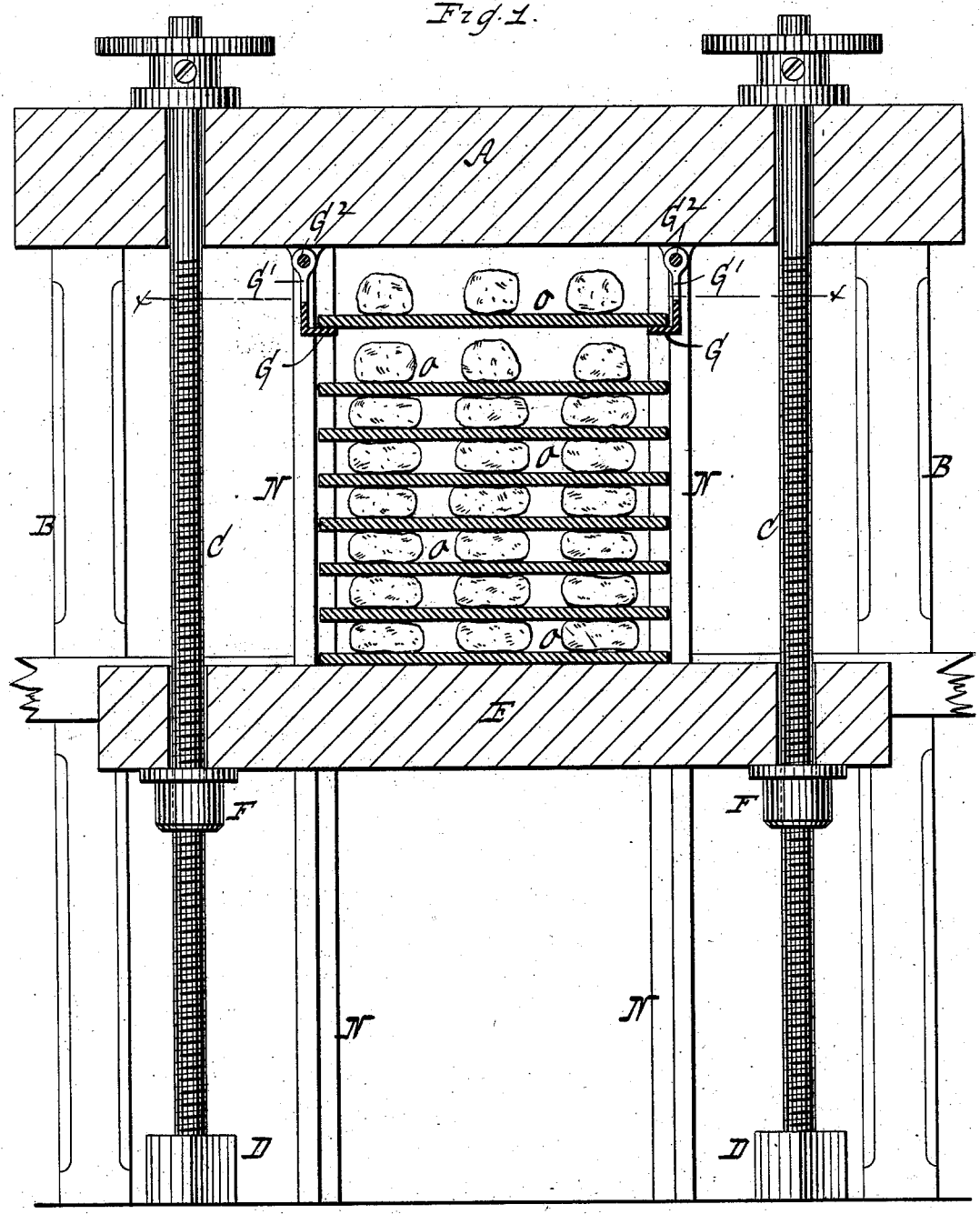
Figure 2:
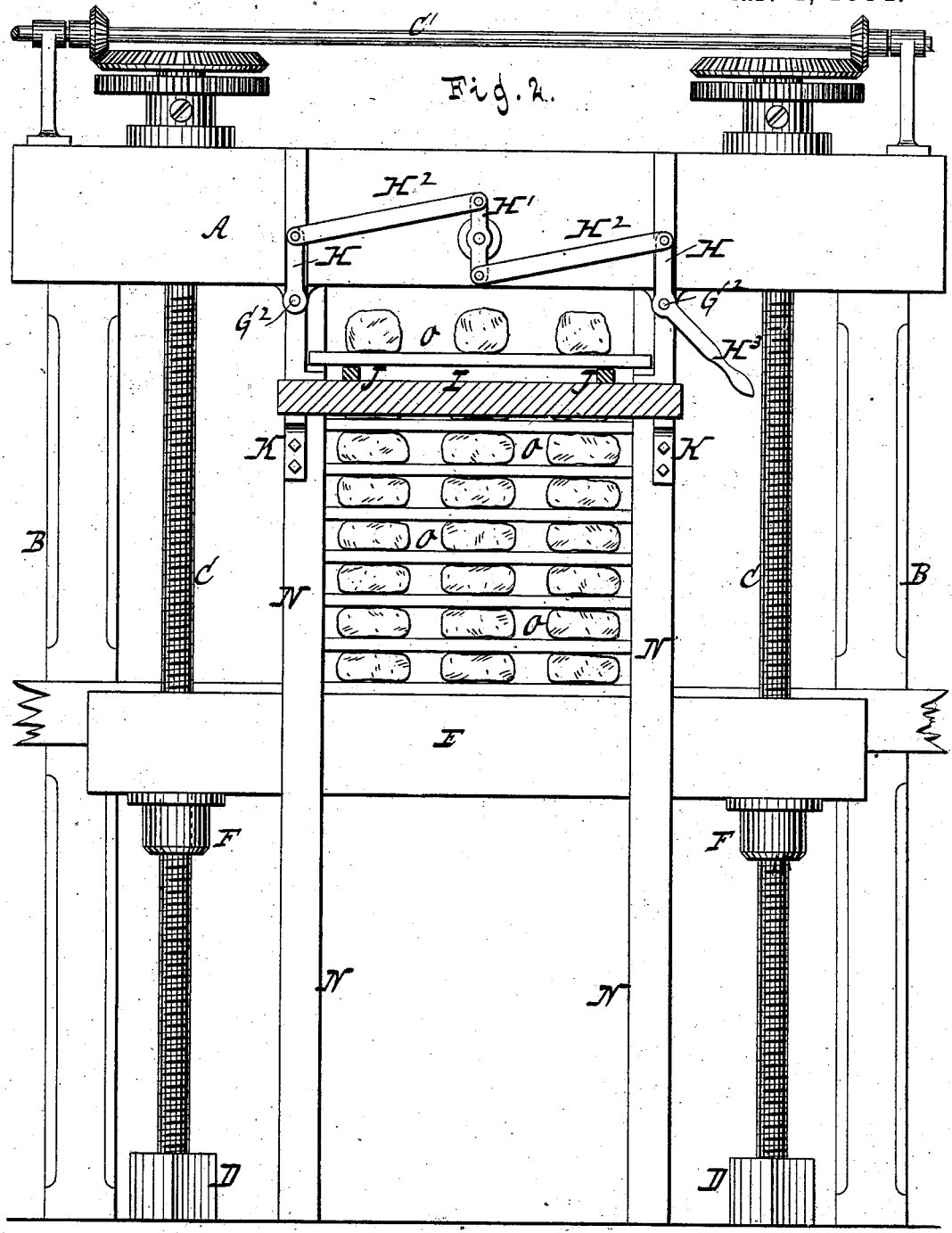
Figure 3:
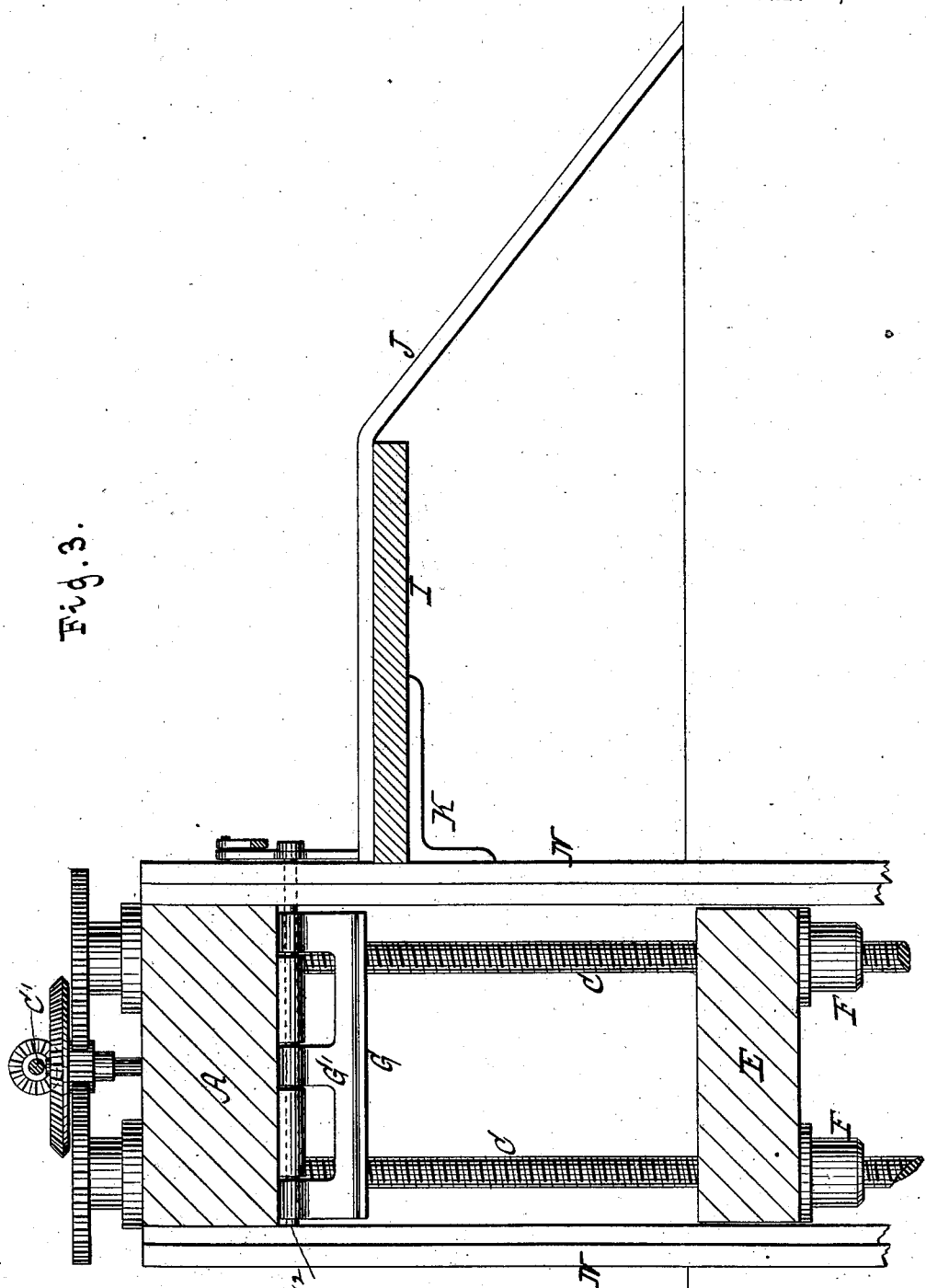

In the accompanying drawings, Figure 1 shows a press in vertical longitudinal section embodying my invention. Fig. 2 is a side elevation thereof. Fig. 3 is a cross-section of the same. Fig. 4 is a horizontal section on the line $x$ $x$, Fig. 1.

Similar letters indicate corresponding parts.

The letter A designates the head-block of the press, rigidly supported by posts B or other suitable means. Through this head-block extend screws C—in this example four in number—which also pass through the bed or follower E, and through nuts F thereof, so that if a revolving motion is imparted to either the screws or the nuts the follower is raised or lowered, as the case may be, by that means. In the present example of my invention the nuts F are fixed to the follower E, to remain stationary, and the screws C are geared together and to a driving-shaft, C', to receive a revolving motion simultaneously in like directions, they being stepped at the lower ends in blocks D.

On the head-block A, or on any other suitable part of the press, are arranged two movable ledges, G, the office of which is to temporarily support, at a point above the follower E, the plates or racks O, containing the material to be pressed. In their normal positions these ledges G are parallel and opposite to each other in a horizontal plane, as shown in Fig. 1, so that the press-plates O may be conveniently slid thereon from one end, and when either of the plates has been properly adjusted on the ledges the latter are in practice displaced simultaneously, so as to deposit the plate on the follower, by the following means: Each of the ledges is supported by a bracket, G', which is hinged to the head-block by a pivot, G², on one end of which is an arm or lever, H, this lever, as well as the ledge-supporting bracket, being fixed to the pivot, so that the bracket shares a motion of the lever and may be operated by that means. The two operating-levers H, concomitant to the two ledge-supporting brackets G', are connected together by an intermediate lever, H', and rods H², in such a manner that by moving either of the bracket-levers or the intermediate lever in the proper direction the ledge-supporting brackets are swung away from each other, thereby displacing the ledges, while when the parts are released the ledges return to a normal position by gravity, they remaining in that position until again displaced. For convenience of operation, one of the levers—in this example one of the bracket-levers H—is provided with a handle, H³.

On one side of the press is a platform, I, which serves to receive and support the press-plates H while they are being filled or emptied, this platform being substantially in the horizontal plane of the ledges G, and being supported by brackets K or other suitable means. From the outer edge of the platform I extend, on an inclined plane to the ground or any other proper place, rails J, to permit the press-plates O to be conveniently elevated to or lowered from the platform, these rails being also extended along the platform to facilitate the movement of the plates thereon to or from the press. The press-plates, which are deposited on the follower E by or from the ledges G, are received in vertical ways N, and thereby guided in the up-and-down movement of the follower to preserve a true vertical plane, these ways being located at the corners of the press-plates, and being united at the upper ends to the head-block, or any other suitable part of the press-structure.

The following is a brief description of the method of working the press. The bed or follower E is raised to within a short distance of the ledges G. A press-plate is brought up on the platform I and the plate is filled with the proper material, as with bags containing lard. The filled plate is then slid into the press on the ledges G, and when it has reached the proper position to enter the guideways N the ledges are displaced to deposit the plate on the follower. The screws C are then started to lower the follower at a speed that will suffice to clear a space for the next plate by the time it can be filled. Each successive plate is filled and deposited on the preceding one until the follower has reached the lower limit of its movement and the press is entirely loaded, when the motion of the screws is reversed to raise the follower and properly compress the material. When the press is to be unloaded, the material is relieved from pressure and the top plate, with its load, is drawn out on the platform I. The follower E is then made to rise, and the plates are withdrawn as fast as they reach the level of the table I, until the follower has been entirely emptied, when it is stopped, it being then in the proper position to be reloaded.

It should be understood that, instead of the screws C and concomitants, any other suitable medium may be employed for raising and lowering the follower.

What I claim as new, and desire to secure by Letters Patent, is—

1. The combination, with the movable ledges, arranged opposite each other, for supporting the press-plates, of devices connecting the said ledges together and positively moving them simultaneously from the press-plates, to permit the latter to descend, substantially as described.

2. The combination, substantially as hereinbefore set forth, of the movable ledges for temporarily supporting the press-plates at a point above the follower, the hinged brackets supporting the ledges, the operating-levers of the brackets, and the intermediate lever and rods connecting such operating-levers together.

3. The combination, substantially as hereinbefore set forth, of the platform arranged on the side of the press to receive the press-plates, and the inclined rails leading from such platform.

4. The combination, substantially as hereinbefore set forth, of the movable ledges for temporarily supporting the press-plates at a point above the follower, and the platform arranged on one side of the press, substantially in the horizontal plane of the ledges, to receive the press-plates, which are to be placed on the ledges, or which are removed therefrom.

5. The combination, substantially as hereinbefore set forth, of the movable ledges for temporarily supporting the press-plates at a point above the follower, and the vertical ways adapted to receive and guide the press-plates deposited on the follower by the ledges.

In testimony whereof I have hereunto set my hand and seal in the presence of two subscribing witnesses.

GEO. B. BOOMER. [L. S.]

Witnesses:
CHAS. WAHLERS,
E. F. KASTENHUBER.